United States Patent Office 3,372,513
Patented Mar. 12, 1968

3,372,513
PROCESS FOR CONTROLLING PLANT GROWTH BY THE COMBINATION OF DIRECT SUNLIGHT AND REFLECTED COLORED LIGHT
Bernard Edward Shlesinger, Jr., Robert Edward Shlesinger, and Mary Kathleen Shlesinger, all of 3906 Bruce Lane, Annandale, Va. 22003
No Drawing. Filed Apr. 20, 1966, Ser. No. 543,781
1 Claim. (Cl. 47—58)

ABSTRACT OF THE DISCLOSURE

A method for controlling the speed of stem elongation of growing plants shortly after germination including the steps of exposing the germinated plants and the area about the plants to direct solar light and placing in the area about the plants deflecting material so as to produce at least a visually noticeable amount of reflected color light on the plants and controlling the total amount of light on the plants by varying the amount and proximity of the reflecting material.

---

This invention relates to the speeding up or slowing down of the growth of plants and particularly with the method for doing the same.

GENERAL SUMMARY

In general, this invention relates to the method for controlling the speed of growth of plants by exposing plants and the area about the plants to direct solar radiation and placing in the area about the plants sufficient similarly colored reflecting material to produce a visually noticeable amount of reflected color light on the plants and thus to increase or decrease the speed of growth of the plants according to the type of colored reflector used.

HISTORY AND DEVELOPMENT

The first man to experiment with colored light on plants was the German botanist Sach. He subjected plants to streams of colored light the colors being red and blue. Allowing photosynthesis to take place, he found that considerably more starch was produced in the red light than in the blue light.

Engelman, another German botanist found that by arranging prisms, and casting the light from the spectrum on different parts of green algae, the effect of the various colors was quite noticeable. The results of his experiments indicated that growth was greatest in the orange-red region, slightly less in the dark green-blue violet region and hardly any in the yellow-light green region.

Recently, there has been a considerable amount of development by the United States Department of Agriculture at Beltsville, and also at the University of Kentucky with regard to the effects of colored light on plants. In these experiments, greenhouses have been coverd with tinted films of polyethylene or the like. Maturity in the clear house, was faster than in any of the tinted houses but there were substantial differences between different colored houses. The experiments did indicate that there was a significant difference between various plants but that in general the colored houses were less effective than the clear house with certain exceptions.

Reflectors have been used for many years in the growth of plants as noted by Toulman 2,986,842, British Patent 377,171, issued January 15, 1931, and Benson 2,777,253.

In addition to the above, many articles have been written concerning the use of colored light on plants by such renowned experts as R. J. Downs, H. A. Borthwick, and A. A. Piringer, Jr., of the United States Department of Agriculture at Beltsville, Md.

This invention provides a cheap and inexpensive method of utilizing direct light and specifically white light in conjunction with colored reflectors to produce growth effects on plants. The method is inexpensive and can be carried on inside or outside. It avoids the necessity of having large expensive electrical apparatus or colored plastic films surrounding an entire greenhouse and is readily changeable to vary the needs required.

OBJECTS

Yet another object of this invention is to provide a method for slowing down the growth of plants.

Another object of this invention is to provide a method for speeding up the growth of plants.

Yet a further object of this invention is to provide a method for affecting the growth of plants which can be utilized in hot houses or in the field.

A further object of this invention is to provide a method of altering the growth of plants utilizing materials which are inexpensive and readily available.

These and other objects of this invention will be apparent from the following description and claim.

THE PROCESS

In this process, the grower is able to utilize direct light as well as reflected light of a certain wave length depending upon whether he wants to increase or decrease the speed of growing, whereas in the past, where reflections have been used, they have invariably been reflectors of white light such as mirrors, silvered surfaces, aluminum or the like which merely increased the concentration of white light. The red reflector for example tends to absorb nearly all of the light in the upper end of the visible spectrum and reflect the red end on the plant thereby eliminating much of the undesirable light which has an adverse effect on plant growth while still permitting the benefits of direct light on plants. It also takes advantage of the fact that no artificial light need be used and solar energy will provide all of the necessary light both direct and indirect. (By solar energy, we mean energy from the sun or its equivalent.)

It is believed that the observable effect of colored reflected light on plant growth when used with direct light occurs when the reflected light on the plant is noticeably visible to the grower.

PROPER REFLECTION

To illustrate the visual effect, plants such as garden peas which have just sprouted are surrounded by red reflectors. The red reflector pick up the white light and bounce the red wave length onto the plant leaves. The reflectors must be sufficiently close to the plants to show a visible red tint to the leaves. This can be readily seen by placing a similar plant against the normal background of the earth without a reflector in its proximity. Once the visual appearance of the tinted light is observed on the plant, it can be increased by the amount of reflective surfaces placed about the plant or in the neighborhood thereof. It will be obvious, that if the reflective surface is too high above the plant, very little light will reach the plant whether direct or indirect since the reflectors will shade out all of the direct light as well as a good portion of the reflected light. It is therefore not intended that the reflectors eliminate the direct light by merely providing shading but that they be positioned so as to permit the direct light to fall on the plants without interference.

The amount of reflectivity on the surface of the plant is to some extent determined by the kind of reflective material used. If for example colored reflective foil is placed in the area about the plant, a high degree of color on the plant is observable per unit area of reflective surface. Colored red chips or red dyed cotton or red dyed granular material placed about the plants require larger amounts of reflective surface area in order to produce an observable visual effect on the plant since these means are not as highly reflective.

The tinted foil may be laid in strips adjacent the plant rows where we have a row crop, or may be randomly distributed between the plants by means of a blower or the like. In random distribution, it is preferred that the material used be granulated or in chip form. This provides ease in handling and has the added advantage in that the granular material may be of a type which can be readily absorbed into the soil for additional nutrients or the like. Colored fertilizer, or cotton, or similar mulching materials may be used.

Where the plants are grown close together, vertical reflective surfaces may be utilized periodically at distances of several feet to permit reflection from the vertical surfaces without too much interference in plant growth.

*Experiment 1*

In this experiment, garden pea seeds were planted in rectangular areas utilizing (1) a control and areas surrounded by (2) red reflectors, (3) green reflectors, and (4) yellow reflectors (gold). The results two weeks after germination indicated that the pea plants surrounded by the reflectors had increased in size over the control by as much as 50% with the red reflectors, 40% with the green reflectors, and had decreased from the control as much as 25% with the gold reflectors.

A number of test samples were run utilizing a control and various types of plants such as corn, beans, and peas, in order to determine the effect of different types of foil, the necessary proximity to the plant, and the height about the plant. In general, it can be said that in all instances, the experiments proved that all of the plants grew faster in with red, green and blue foil than with yellow foil and that in all instances, the yellow foil produced less growth than the control.

Where chips, cotton, or granular material which had been colored were used, the effect of the red and blue was sharply noticeable as compared with the yellow and the yellow was less than the control.

Illustrating this factor is the fact that garden peas after germination showed a growth of 5 inches for the control in a two week period as compared with seven and a half inches when utilizing a red reflector, 7 inches when utilizing a green reflector, and 2½ inches when using a yellow reflector even though all plants were exposed to the direct light of the sun at all times during daylight hours.

It was further observed that using blue reflectors did show an increase in plant growth about the same as with green reflectors though less than red.

*Experiment 2*

A typical experiment was run utilizing beans, peas, and corn in which all three were planted simultaneously. At the time of sprouting, and shortly after germination, the reflectors were installed adjacent the various plants which had been set out in individual units including one having red reflectors, one blue reflectors, and one yellow reflector. A control was maintained with no reflectors whatsoever.

The following table illustrates the growth rate for a period of three days after a planting twelve days previously with the reflectors having been installed just after germination. The table illustrates the growth height in inches for the three days referred to above for the various plants described:

TABLE 1

| Reflector | Plant | 13th Day | 14th Day | 15th Day |
| --- | --- | --- | --- | --- |
| Red | Beans | 6½ | 7 | 9 |
|  | Peas | 3½ | 4½ | 5½ |
|  | Corn | 4½ | 5 | 5½ |
| Blue | Beans | 6¼ | 6¾ | 8¾ |
|  | Peas | 3 | 3¼ | 3½ |
|  | Corn | 3½ | 3¾ | 4½ |
| Yellow | Beans | 6 | 6½ | 8¼ |
|  | Peas | 1¾ | 1⅞ | 2 |
|  | Corn | 3 | 3⅜ | 3½ |
| Control | Beans | 6¼ | 6¾ | 8½ |
|  | Peas | 1⅞ | 2¼ | 2¾ |
|  | Corn | 3¾ | 4 | 5 |

It is to be noted that the peas, beans and the corn developed rapidly under red and blue reflectors whereas slowly under the yellow reflectors as compared with the control.

*Experiment 3*

Other types of plants such as bachelor buttons after approximately three weeks growing time in which the sprouts were grown in areas covered respectively with colored cotton, colored chips and colored granular material, showed that the most rapid growth occurred with red cotton etc. as compared with the control and that yellow colored cotton, chips, or granular material produced a slower growth rate as compared with the control.

FURTHER EXPERIMENTATION

It was further determined that with flowering plants such as daffodils where the buds had reached the same stage of development and were then surrounded by a colored foil reflector, those having red reflectors produced earlier blossoms than the control whereas those having yellow reflectors were slower than the control.

The granular material, the chips or the cotton, these materials can be spread mechanically or by pneumatic means as desired. Large areas can be covered in the early spring as for example large fields or the like. Small areas such as in greenhouses can be provided with side reflectors etc. In general, the results have indicated an inexpensive way of controlling plant stem growth. If the grower wishes to slow down the plant growth, he need merely utilize a yellow colored reflector about his plants whereas if he intends to increase plant growth, the red, blue or green reflectors though it would be obvious that the red and yellow would be sufficient to provide all of the necessary aspects of plant growth control. The costs therefore of keeping large amounts of various colored reflective materials on hand would be unnecessary since only two colors would be required to obtain any desired effect within the range and scope of the invention contemplated.

Having thus described our invention what we claim is:

1. A method for decreasing the speed of stem elongation of growing corn shortly after germination including the steps of:
    (a) exposing the newly germinated corn plants and the area about said plants to direct solar light,
    (b) placing in the area about said plants sufficiently similarly colored yellow reflecting foil material at a proximity from said plants to produce at least a visually noticeable amount of reflected colored yellow light on said plants,
    (c) whereby an inhibition of stem elongation from normal occurs.

(References on following page)

References Cited

UNITED STATES PATENTS

| | | | |
|---|---|---|---|
| 80,012 | 7/1868 | Robbins | 47—32 |
| 1,882,377 | 10/1932 | Whittelsey | 47—9 |
| 1,930,939 | 10/1933 | Horner | 47—9 |
| 2,940,219 | 6/1960 | Schiller | 47—32 |

FOREIGN PATENTS

| | | |
|---|---|---|
| 9,487 | 4/1891 | Great Britain. |
| 142,074 | 10/1930 | Switzerland. |
| 725,516 | 11/1931 | France. |
| 1,143,946 | 3/1956 | France. |

OTHER REFERENCES

Carpeted Garden, Pratt, Ladies Home Journal, November 1949, page 102 relied on.

The Gro-Lux Fluorescent Lamp, Sylvania Lighting Products; Salem, Mass., Bulletin 0.262, 1963.

ROBERT E. BAGWILL, *Primary Examiner.*